United States Patent [19]

Linhart

[11] 4,248,613
[45] Feb. 3, 1981

[54] AIR PRECLEANER FOR INTERNAL COMBUSTION ENGINE

[76] Inventor: Donald E. Linhart, Rte. 2, Box 234, Gresham, Oreg. 97030

[21] Appl. No.: 70,169

[22] Filed: Aug. 27, 1979

[51] Int. Cl.³ .............................................. B01D 45/12
[52] U.S. Cl. ...................................... 55/394; 55/456; 55/337; 55/350
[58] Field of Search .............. 55/337, 385 B, 394–398, 55/456, 457, 447, 350

[56] References Cited

U.S. PATENT DOCUMENTS

| | | | |
|---|---|---|---|
| 1,843,091 | 1/1932 | Bull | 55/457 |
| 1,934,311 | 11/1933 | Kegerreis | 55/394 |
| 2,214,658 | 9/1940 | Browning | 55/398 |
| 4,014,673 | 3/1977 | Kinnison | 55/396 |

FOREIGN PATENT DOCUMENTS

| | | | |
|---|---|---|---|
| 1214309 | 12/1970 | United Kingdom | 55/447 |
| 1526701 | 9/1978 | United Kingdom | 55/456 |

OTHER PUBLICATIONS

RW Compact Dry Filter–Accessory Sales Inc., P.O. Box 186, Royal Oak, Mich.

*Primary Examiner*—Bernard Nozick

[57] ABSTRACT

An air precleaner for an internal combustion engine includes an outer cylindrical casing with a top air intake opening and a set of stationary vanes within the casing which impart a centrifugal motion to air entering the casing. A clean air discharge tube positioned centrally within the casing extends from an upper air inlet below the vanes through a frusto-conical bottom of the casing to a connection with the conventional air filter of the engine. The bottom wall of the casing includes a generally radially extending slot, the upstream edge of which is offset downwardly from the downstream edge to discharge dirt-laden air from outer portions of the casing back to the atmosphere while cleaner air at central portions of the casing is drawn by engine suction through the discharge tube and air filter into the engine.

1 Claim, 3 Drawing Figures

AIR PRECLEANER FOR INTERNAL COMBUSTION ENGINE

BACKGROUND OF THE INVENTION

1. Field of the Invention

The present invention relates to an air precleaner adapted to be positioned upstream of the conventional air filter on the air intake side of the internal combustion engine for removing the bulk of the intake air contaminates before the air reaches the air filter, thereby prolonging the life of the filter.

2. Description of the Prior Art

The use of air precleaners for the internal combustion engines of vehicles which operate in a dirty environment, such as earth-moving vehicles and agricultural tractors, is well known. The most widely used precleaners are those of the type shown in the Wilson U.S. Pat. No. 3,354,621, issued Nov. 28, 1967. In the Wilson type precleaner, air enters an air intake opening at the upper end of a cylindrical casing past stationary vanes which spin the air and, through centrifugal force, drive dust particles to the periphery of the casing, causing such particles to drop down past a baffle into a dead air compartment at the bottom of the casing. The cleaned air passes downwardly through a central discharge tube leading to a conventional air filter before going to the engine's carburetor. A hose connects the dead air compartment to a venturi tube attached to the engine's exhaust pipe. Suction created at the venturi tube draws collected dirt and dust particles from the dead air compartment and discharges it with the engine exhaust to atmosphere. The venturi tube, connecting hose and attendant couplings add considerably to the cost of the precleaner and complicate installation.

Others have sought to design precleaners which do not rely on engine or exhaust suction to remove collected dirt and dust particles therefrom. For example, Shaw U.S. Pat. No. 2,229,824 discloses a precleaner in the shape of an inverted cone with a tangential upper air intake which induces a downward cyclonic flow to the air stream to discharge dirt and dust into a removable container communicating with a bottom opening of the chamber, while engine suction induces a counterflow of clean air through a central portion of the chamber to the engine. The primary disadvantage of this approach is the required periodic removal and emptying of the container, during which time the powered equipment would be shut down.

Several other devices for cleaning air using a centrifuging action have been suggested, such as those shown in U.S. Pat. Nos. 3,923,481 to Farrow; 3,907,529 to Borsheim; and 3,566,586 to Langness; but the complexity of such devices, with their numerous passageways and/or baffles, will be readily apparent and therefore their cost would be prohibitive.

Accordingly, there is a need for a simplified and effective air precleaner for internal combustion engines which is self-cleaning without reliance on engine or exhaust induced suction to remove collected dirt, and which can be manufactured at low cost.

SUMMARY OF THE INVENTION

The present invention is an air precleaner which is effective to clean dirty air before it reaches the conventional oil bath or dry cartridge type air filter at the intake side of the engine, and which is self-cleaning without the aid of engine or exhaust suction. In essence, the precleaner of the present invention employs a centrifuging action to separate the dirt from the intake air and to discharge the dirt from the precleaner without the use of engine or exhaust suction or internal baffling.

In accordance with a principal feature of the invention, an outer cylindrical casing of the precleaner has a frusto-conical endwall with a generally radially extending slot, one edge of which is offset with respect to the other in a direction such that dirt-laden air traveling centrifugally along the endwall is discharged to atmosphere while cleaner air at a central portion of the casing is induced to flow through a concentrically mounted discharge tube within the casing toward the intake manifold of the engine.

Primary objects of the invention are to provide an air precleaner for an internal combustion engine which is:

(a) Inexpensive to manufacture because of its simplified construction;

(b) Self-cleaning without the aid of engine or exhaust suction;

(c) Effective to remove the bulk of dust and dirt particles from the intake air before it reaches the engine's conventional air filter, thereby prolonging the life of such filter; and (d) Virtually maintenance-free.

The foregoing and other objects, features and advantages of the present invention will become more apparent from the following detailed description, which proceeds with reference to the accompanying drawings.

DETAILED DESCRIPTION

Figures 1, 2, 3:
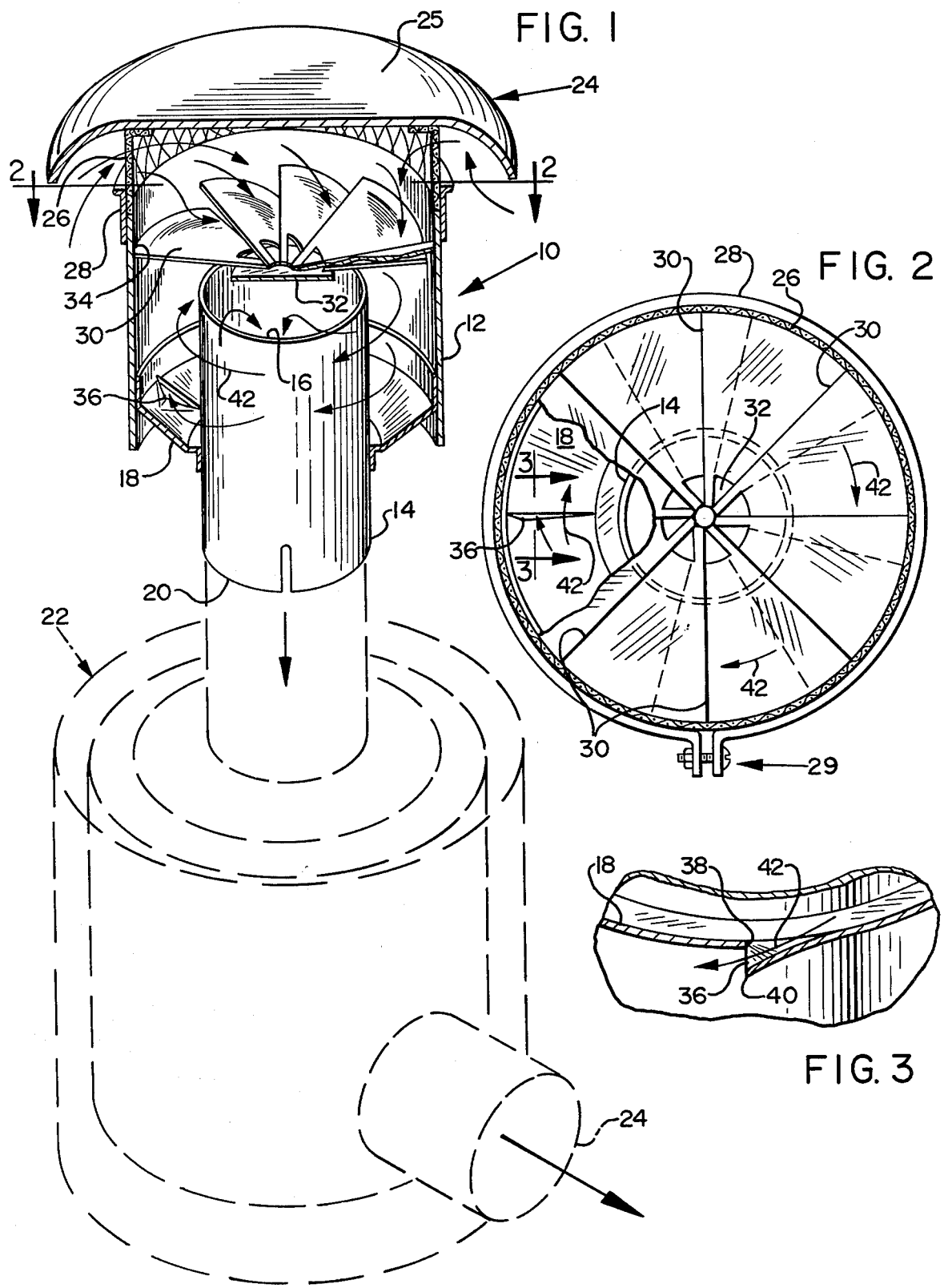
FIG. 1 is a vertically sectioned perspective view of an air cleaner in accordance with the invention shown connected to a conventional air filter depicted schematically in phantom lines.
FIG. 2 is a horizontal sectional view taken along the line 2—2 of FIG. 1.
FIG. 3 is a partial sectional view through the bottom wall of the precleaner of FIGS. 1 and 2 taken approximately along the line 3—3 of FIG. 2.

With reference to the drawing, the air precleaner 10 of the invention includes a vertically-oriented outer cylindrical casing 12 and a smaller diameter cylindrical air discharge tube 14 mounted concentrically within the casing and extending through a bottom wall 18 of the casing. The discharge tube has an open inlet end 16 within the casing and an outlet end 20 below the casing connected to the air intake of a conventional dry cartridge or oil bath air filter depicted schematically at 22. Air filter 22 in turn has an air discharge passage 24 leading to the air intake manifold of an internal combustion engine (not shown).

The open upper end of casing 12 is capped by a hood 24 which includes a downwardly dished cover plate 25, a perforate expanded metal grate portion 26 defining a circumferential air intake opening into the open upper end of the casing, and a split ring portion 28 overlying the upper end portion of the casing. The ring includes screw clamping means 29 for clamping the hood on the casing.

Just below air intake 26 the casing houses a set of stationary vanes 30 which together extend across the inner diameter of the casing and induce incoming air to travel along a downwardly whirling, centrifugal flow path. The individual vanes 30 are joined to a common central mounting plate 32 suspended centrally of the casing. Outer edge portions of the vanes are preferably spot-welded as at 34 to the inside surface of the casing to hold the set of vanes in position between air intake 26 and clean air inlet 16 of discharge tube 14.

Bottom wall 18 of the casing is of generally frusto-conical shape, sloping downwardly from its outer juncture with the casing sidewall to its inner juncture with the discharge tube 14. This bottom wall forms an airtight closure for the lower end of the casing, except for the generally radially extending slot 36 in the sloped portion of the bottom wall which provides a discharge opening to atmosphere. The slotted discharge opening 36 is formed by slitting the bottom wall of the casing along a radial line and then deflecting the upstream edge 40 of the slit downwardly with respect to the downstream edge 38, as shown in FIG. 3. One edge thus becomes vertically offset with respect to the other, with the upstream edge being deflected in a direction such that the downstream edge of the slot in effect becomes a baffle which prevents reentry of the whirling dirt-laden air into the casing. A similar effect could be achieved by deflecting the downstream edge of the slot upwardly relative to the upstream edge. For increased discharge to atmosphere, the slot could be provided with a maximum opening by deflecting the upstream edge downwardly and the downstream edge upwardly. In this manner, the size of the slot can be controlled for optimum dirt removal and self-cleaning effect. "Upstream" and "downstream" as used herein refers to the direction of circumferential airflow, as indicated by arrow 42 in FIGS. 1–3.

OPERATION

In operation, air cleaner 10 is installed upstream of air filter 22. Air filter 22 is connected at its downstream end 24 to the air intake manifold of an internal combustion engine.

With the engine running, negative pressure at the intake manifold induces air to enter the precleaner casing 12 through the air intake opening 26 of hood 24. Hood 24 serves to keep excessive amounts of airborne dirt from entering the precleaner. As the air enters the casing through the intake, vanes 30 spin the air, causing it to travel along a downward centrifugal flowpath as indicated by arrows 42. The centrifuging effect causes the heavier dirt particles in the air stream to travel to the circumferential portions of the casing in their downward travel. The cleaner air at the central portion of the casing is induced by engine suction through the air inlet of discharge tube 14, where it proceeds from the casing into the air filter 22 for further cleaning before being drawn into the intake manifold of the engine. The dirt-laden circumferential air within the casing continues its downward travel along the casing sidewall, and in the airspace between the casing and discharge tube sidewalls, finally reaching the frusto-conical botton wall where it is discharged directly to atmosphere through slot 36. The described self-cleaning effect of the precleaner eliminates the need for periodic cleaning and maintenance.

From the foregoing and a comparison of the precleaner of the invention to that of the aforementioned Wilson patent, it will be appreciated that the precleaner of the present invention eliminates any need for the venturi pipe at the engine exhaust or the connecting hose between the venturi pipe and precleaner and the attendant clamps and openings associated therewith, thereby greatly decreasing the cost of manufacture and maintenance without loss of effectiveness.

The precleaner could be adapted to an updraft system by, in effect, inverting the precleaner so that the air intake and vanes 30 are adjacent to the bottom endwall of the casing and the frusto-conical endwall with radial discharge slot at the top of the casing.

Having illustrated and described the principles of my invention by what is presently a preferred embodiment, it will be appreciated by those skilled in the art that such embodiment can be modified in arrangement and detail without departing from such principles.

I claim as my invention all such modifications as come within the true spirit and scope of the following claims:

1. In an air precleaner for installation upstream of the air filter on the air intake side of an internal combustion engine, in which the precleaner includes an upright outer cylindrical casing with a top air intake opening, an inner clean air discharge tube centered within said casing and extending into said casing a substantial distance with a clean air discharge opening at the upper end thereof to define an air chamber between the sidewalls of the casing and tube and being spaced below said top intake opening, air spinning means positioned within said casing between said top air intake opening and said clean air discharge opening for imparting a downward centrifugal spinning motion to air entering said casing, whereby dirt-laden air follows a downwardly spiraling path between the sidewalls of the casing and the tube, the improvement comprising an inverted generally frusto-conical bottom wall closure for said casing in surrounding relationship to said discharge tube and a substantial distance below said clean air discharge opening, said bottom wall defining one only generally radially extending slot opening therethrough with the upstream edge of the slot offset below the downstream edge of said slot and said slot discharging to atmosphere, whereby clean air is discharged from said casing centrally through said discharge tube and dirt-laden air is discharged from said casing to atmosphere through said slot, said air chamber within said casing between said bottom wall and said air spinning means being unobstructed so that said downward centrifugal spinning motion within said chamber continues unimpeded to said bottom wall.

* * * * *